United States Patent
Dietmeier

(10) Patent No.: US 10,408,657 B2
(45) Date of Patent: Sep. 10, 2019

(54) SPACER TO KEEP A DISTANCE BETWEEN A BAR-SHAPED INNER CONDUCTOR AND AN OUTER CONDUCTOR OF A FILLING LEVEL MEASURING PROBE

(71) Applicant: VEGA GRIESHABER KG, Wolfach (DE)

(72) Inventor: Juergen Dietmeier, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 114 days.

(21) Appl. No.: 15/620,973

(22) Filed: Jun. 13, 2017

(65) Prior Publication Data
US 2017/0356783 A1 Dec. 14, 2017

(30) Foreign Application Priority Data
Jun. 13, 2016 (EP) .................................. 16174228

(51) Int. Cl.
*G01F 23/00* (2006.01)
*G01F 23/284* (2006.01)
*H01P 3/06* (2006.01)

(52) U.S. Cl.
CPC ........ *G01F 23/0046* (2013.01); *G01F 23/284* (2013.01); *H01P 3/06* (2013.01)

(58) Field of Classification Search
CPC ... G01F 23/0046; G01F 23/268; G01F 23/284
See application file for complete search history.

(56) References Cited

U.S. PATENT DOCUMENTS

| | | | | | |
|---|---|---|---|---|---|
| 2,728,546 | A | * | 12/1955 | De Giers | G01F 23/268 174/544 |
| 3,214,655 | A | * | 10/1965 | Di Giacomo | G01F 23/268 361/276 |
| 3,260,903 | A | * | 7/1966 | Kumano | G01F 23/268 361/284 |
| 3,261,906 | A | * | 7/1966 | Gee-Wah | H01B 11/1808 174/107 |
| 3,524,116 | A | * | 8/1970 | Bray | G01F 9/001 361/275.1 |

(Continued)

FOREIGN PATENT DOCUMENTS

DE 103 08 495 A1 9/2004
DE 10 2004 032 965 A1 2/2006

(Continued)

OTHER PUBLICATIONS

Machine translation of DE 202012101989.*
Machine translation of DE 102011009385.*

*Primary Examiner* — David J Bolduc
(74) *Attorney, Agent, or Firm* — Oblon, McClelland, Maier & Neustadt, L.L.P.

(57) ABSTRACT

A spacer for keeping a distance between a bar-shaped inner conductor and an outer conductor of a filling level measuring probe. The spacer includes a ring and at least three supports, which respectively extend out of an inner surface of the ring in a radial direction. Each of the three supports has a curved front surface on an end, which is located away from the inner surface. The end, which is located away from the inner surface is engageable with an opening of the bar-shaped inner conductor.

15 Claims, 7 Drawing Sheets

(56) References Cited

U.S. PATENT DOCUMENTS

| | | | | |
|---|---|---|---|---|
| 5,651,286 | A * | 7/1997 | Champion | G01F 23/284 |
| | | | | 324/642 |
| 6,016,697 | A * | 1/2000 | McCulloch | G01F 23/266 |
| | | | | 73/304 C |
| 6,380,750 | B1 | 4/2002 | Schenck, Jr. et al. | |
| 7,698,940 | B2 | 4/2010 | Osswald et al. | |
| 2013/0009803 | A1 * | 1/2013 | Edvardsson | G01F 23/284 |
| | | | | 342/124 |
| 2016/0069729 | A1 * | 3/2016 | Wardas | G01F 23/284 |
| | | | | 342/124 |
| 2016/0334262 | A1 * | 11/2016 | Haran | G01F 23/284 |
| 2017/0125872 | A1 * | 5/2017 | Heath | H01P 5/08 |

FOREIGN PATENT DOCUMENTS

| | | | | |
|---|---|---|---|---|
| DE | 10 2011 009 385 A1 | 7/2012 | | |
| DE | 202012101989 U1 * | 9/2013 | | G01F 23/284 |
| DE | 10 2012 112 318 A1 | 6/2014 | | |
| EP | 1 541 976 A1 | 6/2005 | | |
| WO | WO 2006/003082 A2 | 1/2006 | | |
| WO | WO 2008/037370 A1 | 4/2008 | | |

* cited by examiner

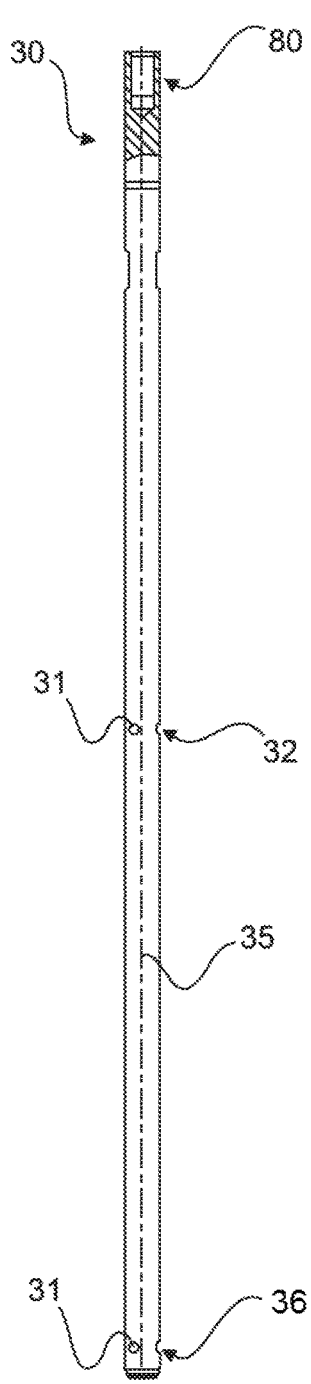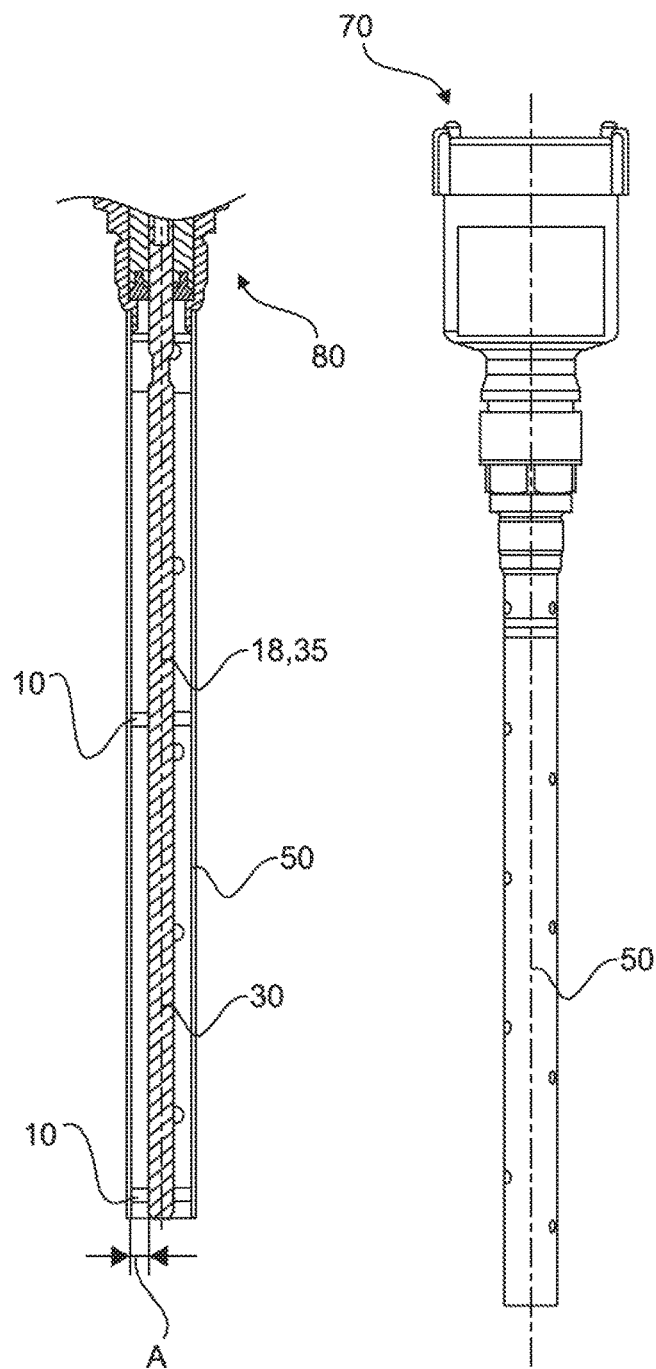
Fig. 15  Fig. 16  Fig. 17

SPACER TO KEEP A DISTANCE BETWEEN A BAR-SHAPED INNER CONDUCTOR AND AN OUTER CONDUCTOR OF A FILLING LEVEL MEASURING PROBE

CROSS-REFERENCE TO RELATED APPLICATIONS

This application claims the benefit of the filing date of European Patent Application No. 16 174 228.3 filed on 13 Jun. 2016, the entire content of which is incorporated herein by reference.

FIELD OF THE INVENTION

The invention concerns a spacer to keep a distance between a bar-shaped inner conductor and an outer conductor of a filling level measuring probe. The invention further concerns a bar-shaped inner conductor of a measuring probe, a measuring probe configured to determine a filling level of a medium in a container, a tool for assembling a spacer on a bar-shaped inner conductor, and an assembly method for assembling a spacer cat a bar-shaped inner conductor.

DESCRIPTION OF THE PRIOR ART

The Time Domain Reflectometry (TDR) is used for determining and analysing of run lengths and reflectance characteristics of electromagnetic waves and signals.

In a TDR-based filling level measuring device an electromagnetic impulse is generated by the electronic of the sensor, then coupled into a conductor, which can, for example, be described as a measuring probe, and then guided along said probe. Coax measuring probes, for example, are used in which a bar-shaped inner conductor is arranged within a tubular outer conductor. After the electromagnetic impulse is coupled into the measuring probe, the impulse is reflected by the surface of the medium to be measured and goes back to an electronic along the measuring probe, wherein the electronic calculates the filling level from the time difference between the emitted and the received impulse.

Such a measuring probe can be exposed to vibrations or rather external shock, so that inaccuracies with measurements can arise. In particular, an unintended relative movement between the tubular outer conductor and the bar-shaped inner conductor of the measuring probe placed inside can emerge, so that the quality of the measured signal will be affected.

SUMMARY OF THE INVENTION

The inventions' purpose is to provide an improved coax measuring probe for filling level measuring.

This purpose is accomplished by the subjects of the independent claims. Exemplary embodiments arise from the dependent claims and the following description.

According to one aspect of the invention a spacer to keep a distance between a bar-shaped inner conductor and an outer conductor of a filling level measuring probe is mentioned. The spacer has a ring-shaped element, also referred to as ring, and at least three support elements, also referred to as supports, which respectively point out of an inner surface of the ring-shaped element in a radially direction. Each of the three support elements has a curved front surface at an end which is located away from the inner surface. The end which is located away from the inner surface is configured to engage with an opening of the bar-shaped inner conductor.

With such spacer it is possible to provide a stable support of the bar-shaped inner conductor, more specifically the inner rod, in a coaxially measuring probe, which is also referred to as filling level measuring probe or just measuring probe. In particular, the measuring probe's suitability in systems with vibration loads can be improved. During the filling level measurement vibrations loads or rather external shocks can occur, which can affect the measurement result.

Due to the spacer it is also possible, to reduce the relative movement between the bar-shaped inner conductor and the outer conductor of the measuring probe under vibration loads. At the same time, electric deviations of the measured signal per spacer can be kept low. For example HF-interference signals, that means high frequency interference signals, can be reduced compared to common connection means for connecting the bar-shaped inner conductor and the outer conductor.

Because of the simple structure a good receding behaviour of the medium to be measured can be achieved and the degree of contamination of the measuring probe can be kept low since few surface areas for contamination within the measuring probe are brought in by the spacer. And, not last, due to the spacer a reliable protection to protect the spacer from falling out of the measuring probe can be ensured.

The ring-shaped element has for example the shape of a tubular segment. The ring-shaped element can be formed as a thin-walled tubular segment, for example in the shape of a thin-walled cylinder. The ring-shaped element can particularly have the shape of a section of a cylindrical surface. Hence, the ring-shaped element has a cylindrical inner surface and a cylindrical outer surface. The three support elements point out of the cylindrical inner surface in a radially direction towards a centre point of the ring-shaped element. The support elements can respectively be arranged in regular intervals on the inner surface along a peripheral direction of the ring-shaped element. For example, the angle between each support element, especially between the radially directions of the support elements is 120° with regard to the peripheral direction of the ring-shaped element.

The three support elements each have an end located away from the inner surface. At this end located away from the inner surface the curved front surface is located, which is, for example, a single curved surface. Single curved surface in the sense of the present invention means, that the surface is bent in only one direction and does not have a curvature in another direction. Thus, the curved front surface can be a segment of a cylindrical surface.

In a preferred embodiment the three support elements each have a respective end which is located away from the inner surface, which further has a plane front surface in addition to the curved front surface, wherein the plane front surface is formed preferably of two plane sections. Therefore each end located away from the inner surface has a curved section, in particular the curved front surface and moreover two plane sections, which are the plane front surface. In other words, the ends of the support elements are formed partially curved and partially plane. The ends of every support element can be formed partially curved and partially plane, whereby wear of the support elements' ends can be reduced or avoided.

Each of the three support elements can also have an end, which points towards the inner surface, whereby the respective support element is fixed to the inner surface of the ring-shaped element. Between this end, which points towards the inner surface, and the inner surface itself a radius can be provided as a transition between the inner surface and the respective support element.

The spacer can have a flexible or rather elastic material so that the spacer can be positioned on the bar-shaped inner conductor by means of a mounting tool and the outer conductor can then be positioned over the spacer. To fix the spacer upon the bar-shaped inner conductor, the end, which is located away from the inner surface of the support elements, is configured to engage with an opening of the bar-shaped inner conductor.

The bar shaped inner conductor can also have three openings, which correspond with the respective support elements of the spacer, so that the end, which is located away from the inner surface of the respective support element, can be engaged with the corresponding opening of the bar-shaped inner conductor. In the event of the end, which is located away from the inner surface of the support element, being engaged with the opening of the bar-shaped inner conductor, the radius of the curved front surface of the end, which is located away from the inner surface, differs from a radius of a surface of the bar-shaped inner conductor. However, the radius of the curved front surface can correspond with the radius of the surface of the bar-shaped inner conductor, while the spacer is positioned on the bar-shaped inner conductor. This aspect will be explained in greater detail in this summary of the invention and in the description of the drawings.

According to an embodiment of the invention the at least three support elements are being reduced in a radially direction. The radially direction is, for example, the middle axis of the respective support element.

The radially direction is a radially direction regarding the ring-shaped element. That means, that the radially direction passes through the centre point of the ring-shaped element. Due to the reduction the cross-sectional area of the support element is greater perpendicular to the radially direction at an end, which points towards the inner surface of the ring-shaped element, than the cross-sectional area of the support element at the end, which is located away from the inner surface of the support element. This aspect will also be explained in greater detail in the description of the drawings.

The at least three support elements can have a circular or an oval cross-sectional area. The shape of the respective support element's cross-sectional can change in radially direction. For example the cross-sectional area of an end, which points towards the inner surface of the ring-shaped element, can have an oval shape, whereby the cross-sectional area of the end, which is located away from the inner surface, can have a circular shape.

In accordance with a further embodiment of the invention the at least three support elements are arranged in regular intervals along a peripheral direction of the rung-shaped element.

The peripheral direction describes the direction, which extends along the cylindrical inner surface or the cylindrical outer surface of the ring-shaped element. Along the peripheral direction the support elements can respectively be arranged in equal intervals on the jailer surface of the ring-shaped element. The angle between the respective support elements can measure 120°. By providing exactly three support elements an effective spacer can be provided for the operation of a coax measuring probe.

For the event, that more than three support elements are provided on the inner surface of the ring-shaped element, a respective smaller angle between the individual support elements can be chosen, whereby the support elements can be arranged in regular intervals along the peripheral direction on the inner surface of the ring-shaped element. Hence, an equal load transmission between the bar-shaped inner conductor and the outer conductor of the measuring probe can be achieved in case of vibration loads.

By providing at least three support elements a sufficient stability or rather resistance against vibration loads as well as a simple assembly of the spacer on the bar-shaped inner conductor can be provided. In particular the support elements can be moved past the surface of the bar-shaped inner conductor during the assembly of the spacer on the bar-shaped inner conductor. This aspect will be explained in greater detail in the following description.

In accordance with a further embodiment of the invention the curved front surface of the respective support element has a radius, of which centre point is not located on a rotation axis of the ring-shaped element or rather the spacer.

In particular, the radius of the curved front surface can be selected, so that during the deformation of the spacer or the ring-shaped element tin optimal controllability of the curved front surfaces of the support elements over a surface of the bar-shaped inner conductor is provided while the assembly. During such a deformation of the spacer a displacement of the curved front surface of the support elements, for example 0.3 mm each, can occur with regard to the centre point of the ring-shaped element. The curved front surfaces are thereby moved away from the centre point. Thus, the curved front surfaces, or rather the support areas of the support elements, are designed in such a way, that the deformation path for assembling onto the bar-shaped inner conductor during the mounting is as low as possible, to avoid damage of the spacer during expansion. In this case, the radius of the curved front surface is in accordance with the radius of the surface of the bar-shaped inner conductor. In other words, the radius of the curved front surface, that is whilst the mounting of the spacer on the bar-shaped inner conductor, is in accordance with the radius of the surface of the bar-shaped inner conductor during the deformation. However, the centre point of the radius of the curved front surface is not located on the rotation axis of the ring-shaped element before or after the assembly, that means in the relaxed state of the spacer. Thus, the curved front surface is configured, to provide an optimal guidance of the spacer over the surface of the bar-shaped inner conductor during the assembly.

In accordance with a further embodiment of the invention the at least three support elements comprise a drilling hole each, whereby the drilling axes of the drilling holes going through the support elements respectively being arranged such, that they are inclined to the rotation axis of the ring-shaped element.

The rotation axis of the ring-shaped element passes through the centre point of the ring-shaped element. Thus, inclined drilling holes are provided in the respective support elements, whereby the drilling holes are configured to take in a pin-shaped element of a mounting tool. The drilling axes of the respective support elements can be inclined to the rotation axis of the ring-shaped element by about 0 to 20', preferably by about 0° to 10° rind particularly by about 2.5°. The drilling holes of the respective support elements can pass through the middle axis of the support elements, whereby the middle axis is located, for example, on the radially direction of the respective support elements.

In accordance with a thither embodiment of the invention the respective drilling axes of the (billing holes going through the support elements meet at one common point, which is located on the notation axis of the ring-shaped element.

In other words, all drilling axes of the support elements have the same inclination to the rotation axis of the ring-shaped element. This inclination is given by the orientation of pin-shaped elements of a mounting tool, which are to be retained by the drilling holes. Because of those inclinations it is possible to stretch or preload the spacer by the pin-shaped elements of the mounting tool to be retained, so that the spacer can be mounted on the bar-shaped inner conductor.

In accordance with a further embodiment of the invention the ring-shaped element has a cylindrical outer surface.

In accordance with a further embodiment of the invention the spacer is made of a synthetic material.

It is particularly possible, that the spacer is made of a polyether ether ketone (PEEK). By using such a material, a high resistance over a wide temperature range can be provided, whereby such a material is further chemical resistant. This is of particular advantage, because the spacer can get into contact with the respective medium to be measured while measuring the filling level.

In accordance with one aspect of the invention a bar-shaped inner conductor of a measuring probe is mentioned. The bar-shaped inner conductor comprises a first row with at least three openings along a peripheral direction of the bar-shaped inner conductor, configured to retain a respective support element of a spacer, in particular of the spacer described above. The openings each have a curved base area with a radius, of which centre point is not located on a rotation axis of the bar-shaped inner conductor.

It is possible to mount the already described spacer on said bar-shaped inner conductor, so that the spacer aligns the bar-shaped inner conductor and the outer conductor of the filling level measuring probe with each other in a basically coaxial orientation. In this regard, the openings in the form of recesses at the surface of the bar-shaped inner conductor can be provided at a surface of the bar-shaped inner conductor. The openings can be provided as drilling holes in the bar-shaped inner conductor, whereby the base area of the openings take on a single curved shape. Single curved base area also means, that the base area is bent along one direction, for example along a peripheral direction of the bar-shaped inner conductor, and does not have a curvature in another direction, which, for example, is parallel to the rotation axis of the bar-shaped inner conductor, in order to provide an optimal support.

The curved base area of the opening has the same curvature as, for example, the curved front surface at the end, which is located away from the inner surface of the spacer's support element. Thus, the end, which is located away from the inner surface, in particular the curved front surface of the support element of the spacer, can rest on the curved base area of the bar-shaped inner conductor during the engagement. Especially the recesses, that means the openings, are formed in the bar-shaped inner conductor with the same radius as the curved front surface of the support elements of the spacer.

In accordance with an embodiment of the invention the curved base area of the openings is single curved. A rotation axis of the single curved base area of the opening and the rotation axis of the bar-shaped inner conductor are arranged at a distance from one another.

The curved base area of the openings is adjusted to the curved front surface of the support elements. It is particularly possible, that the curved front surface of the support element of the spacer can rest on the curved base area of the bar-shaped inner conductor during the engagement in the openings of the bar-shaped inner conductor. The curved base areas of the respective openings and the bar-shaped inner conductor further have rotation axes, which are arranged at a distance from each other. Furthermore, the rotation axes of the curved base areas of each opening are arranged at a distance from one another. In other words, every curved base area has a radius, of which centre point is located on its own rotation axis, whereby the rotation axes of the curved base areas of each opening are arranged at a distance from one another.

In accordance with a further embodiment of the invention the bar-shaped inner conductor comprises a second row with at least three openings along a peripheral direction of the bar-shaped inner conductor, configured to retain a respective support element of a spacer, in particular of the already described spacer. The second row with the at least three openings and the first row with the at least three openings are arranged at a distance from one another along a rotation axis of the bar-shaped inner conductor. Additional rows with at least three openings in the bar-shaped inner conductor are also possible.

Thus, a number of spacers can be provided at the bar-shaped inner conductor. For example, exactly two spacers are provided between the bar-shaped inner conductor and the outer conductor to improve the vibration characteristics of the measuring probe.

The support elements of a first spacer can, for example, engage with the first row of openings, whereby the support elements of a second spacer engage with the second row of openings in the bar-shaped inner conductor.

In accordance with a further aspect of the invention a measuring probe, configured to determine a filling level of a medium in a container is mentioned. The measuring probe comprises at least a spacer, a bar-shaped inner conductor with at least three openings along a peripheral direction of the bar-shaped inner conductor, and an outer conductor. The spacer can be the already described spacer with the corresponding characteristics. The bar-shaped inner conductor can also be the already described bar-shaped inner conductor. The spacer is configured to align the bar-shaped inner conductor with the outer conductor in a basically coaxial way by engaging the support elements with the openings of the bar-shaped inner conductor.

With such a measuring probe it is possible to improve the resistance against vibration loads and, at the same time, to provide a good receding behaviour of the medium to be measured within the measuring probe. Furthermore it is possible to avoid a build-up of a medium to be measured within the measuring probe.

During the engagement of the support elements with the openings of the bar-shaped inner conductor the curved front surfaces of the respective support elements of the spacer can be placed on the corresponding curved base areas of the respective openings of the bar-shaped inner conductor. Thus, a tight fit between the bar-shaped inner conductor and the spacer can be provided. Furthermore, due to a small gap a nearly tight fit between the cylindrical outer surface of the ring-shaped element and an inner surface of the outer conductor can be provided. It is also possible that no gap is provided, so that a tight fit without clearance results. Anyway, a tight or rather nearly tight fit of the bar-shaped inner conductor in the outer conductor of the measuring probe can be provided and an overall improved stability of the measuring probe against vibration loads can be achieved.

In accordance with an embodiment of the invention the bar-shaped inner conductor and the outer conductor are aligned in a essentially coaxial way by two spacers arranged at a distance from one another along a rotation axis of the bar-shaped inner conductor.

By providing two spacers on the bar-shaped inner conductor for keeping a distance between the outer conductor and the bar-shaped inner conductor an improved resistance of the entire measuring probe against vibration loads can be provided.

The acting forces of the outer conductor are transmitted over the outer surface of the spacer to the spacer, and further transmitted through the support elements of the spacer to the bar-shaped inner conductor. Accordingly, the transmission of the acting force can also take place in the opposite direction.

In accordance with a further embodiment of the invention the ring-shaped element of the spacer has a cylindrical outer surface. A gap is provided between the cylindrical outer surface of the ring-Shaped element and an inner surface of the outer conductor.

The cylindrical outer surface of the ring-shaped element can have a dimension, which corresponds with the inner surface of the outer conductor of the measuring probe, so that a predetermined distance or rather a gap between the spacer and the outer conductor can be provided. Therefore, a nearly tight fit between the outer conductor of the filling level measuring probe and the bar-shaped inner conductor can be ensured, so that an improved resistance of the filling level measuring probe against vibration loads or rather external shocks can be achieved. Thus, the impact due to vibration movements of the filling level measuring probe on the measurement result can be reduced. At the same time, a simple assembly of the coaxially filling level measuring probe comprising of the bar-shaped inner conductor and the outer conductor can be provided due to the assemble of the spacer.

In accordance with a further aspect of the invention a tool for assembling an already described spacer on a bar-shaped inner is mentioned.

In particular, the tool is configured to position the spacer on the bar-shaped inner conductor, so that the support elements of the spacer can be engaged with the openings of the bar-shaped inner conductor. The tool comprises, for example, a ring-shaped clamping device with at least three pin-shaped elements. The pin-shaped elements can respectively have a longitudinal direction and be movably mounted within the ring-shaped clamping device such, that the longitudinal axes of the respective pin-shaped elements always meet in one point. The pin-shaped elements can be arranged in regular intervals at a front surface of the ring-shaped clamping device in regular intervals along a peripheral direction. An angle between the respective pin-shaped elements in relation to the peripheral direction measures, for example, 120°. The pin-shaped elements can be configured to pretension the spacer on the bar-shaped inner conductor for the assembly by moving the tool along a rotation axis of the ring-shaped element, so that the pin-shaped elements, which are inclined to the rotation axis of the ring-shaped element, can be pushed into the drilling holes of the support elements.

The pin-shaped elements are configured to engage with the drilling holes provided in the support elements of the spacer, whereby pushing the pin-shaped elements of the tool into the holes of the support elements leads to a widening or rather pre-tensioning of the spacer. In other words, the spacer is expanded, so that the support elements can be guided over the surface of the bar-shaped inner conductor to position the spacer at the respective position at the bar-shaped inner conductor.

After the spacer is positioned, the pin-shaped elements can be pulled out of the drilling holes of the support elements, so that the spacer may be relaxed and the support elements of the spacer engage with the openings of the bar-shaped inner conductor.

In accordance with a further aspect of the invention an assembly method for assembling a spacer, as described above, on a bar-shaped inner conductor is mentioned. In a step of the assembly method a pre-tensioning of the spacer takes place, so that the support elements of the ring-shaped element are movable over a surface of the bar-shaped inner conductor along as rotation axis of the bar-shaped inner conductor. In a further step a positioning of the spacer with respect to the bar-shaped inner conductor takes place by moving the spacer along the rotation axis of the bar-shaped inner conductor. In a further step of the assembly method a relaxation of the spacer takes place, so that the support elements of the ring-shaped element engage with corresponding openings of the bar-shaped inner conductor.

The described tool for assembling the spacer can be used for the assembly method. In a further step of the method, a pre-tensioning of the spacer takes place, so that the support elements of the ring-shaped elements can be pulled out of the corresponding openings of the bar-shaped inner conductor to remove the spacer from the bar-shaped inner conductor. Thus, the assembly method can also comprise the disassembly of the spacer from the bar-shaped inner conductor.

Due to the inventive spacer it is possible, to ensure a stable support of the bar-shaped inner conductor within the coaxially measuring probe. In particular the ability of such probes to measure under vibration loads is improved. It only comes to a low electric deviation of the measurement signal per spacer, so that measurement accuracy is not influenced by the spacer. Furthermore a good receding behaviour of the medium to be measured is provided and contaminations within the measuring probe are avoided, because only few surface areas for contamination within the measuring probe are brought in by the spacer. The spacer is also prevented from falling out of the measuring probe in a mounted condition.

The spacer can be made of a stable synthetic material, for example polyether ether ketone (PEEK) with a high resistance over a wide temperature range and chemical resistance. The spacer can be deformed with tilted holes, more specifically drilling holes, or by approaches with a tool in such a way, that it can be pushed onto the bar-shaped inner conductor. In other words, blind holes instead of drilling holes can be provided in the support elements, whereby the drilling axes of the blind holes are respectively inclined to the rotation axis of the ring-shaped element. In each support element of the spacer a respective blind hole can be provided, of which drilling axis is inclined to the rotation axis of the ring-shaped element of the spacer. Thus, the spacer can be mounted on the bar-shaped inner conductor with the already described tool, while the tool's pin-shaped elements engage with the blind holes of the support elements of the spacer and therefore pretension the spacer to position the spacer over the bar-shaped inner conductor.

After removing the tool the support elements of the spacer comes to rest in the recesses of the bar-shaped inner conductor. In other words, a position is defined by the raster and the spacer is prevented from relocating or twisting with respect to the bar-shaped inner conductor. The contact surfaces, that means the curved front surfaces of the support elements, are configured such, that the deformation path for sliding onto the bar-shaped inner conductor is as low as possible in order to avoid damage of the spacer during pre-tensioning or rather widening. In this case, the radius of the curved front surface of the respective support element is equal to the outer radius of the surface of the bar-shaped inner conductor.

The recesses or rather the openings have also a curved or rather single curved base area, which is formed to optimally support the curved front surface of the support elements with the same radius. Preferably, three support elements are provided to take up the acting force. An outer ring section between the support elements of the ring-shaped element is designed elastically, so that pushing the three support elements outwards during the pre-tensioning of the spacer is possible at the same time. Only this way the spacer can be positioned over the outer diameter, that means over the surface of the bar-shaped inner conductor, at the places, where the openings or rather recesses are located. Because of the outer surrounding ring-shape the spacer cannot expand itself, and thus disengage itself. During the assembly with the surrounding ring-shaped element lateral forces, which act on the bar-shaped inner conductor due to vibrations, are transmitted onto the outer ring by the engaged support elements and absorbed by the tubular outer conductor in all directions.

Ultimately, by the spacer a stable coaxial system consisting of a stable material can be provided for the coaxial measuring probe. The material can take up lateral forces and cannot be moved. Furthermore, such a measuring probe has a cheap design for a good receding behaviour of media and for a reduced HF-interference signal.

BRIEF DESCRIPTION OF THE DRAWINGS

FIG. 15 shows a side view of a bar-shaped inner conductor according to an embodiment of the invention.

FIG. 16 shows a sectional view of a coaxial measuring probe according to an embodiment the invention.

FIG. 17 shows a side view of a coaxial measuring probe according to embodiment of the invention.

DETAILED DESCRIPTION OF THE PREFERRED EMBODIMENTS

The figures are schematic and not true to scale.

If the same reference signs are used for different figures in the following description, same or similar elements are described. Same or similar elements can also be described with different reference sips.

Figure 1:
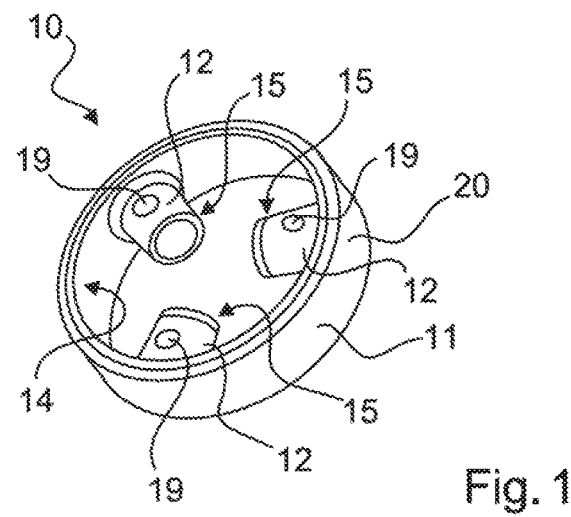
FIG. 1 shows a perspective view of a spacer according to an embodiment of the invention.

FIG. 1 shows a perspective view of a spacer 10, whereby the spacer 10 comprises a ring-shaped element 11 and three support elements 12. Furthermore, drilling holes 19 are provided in each of the three support elements 12. In particular, one drilling hole 19 is provided in each support element 12. The drilling hole can be a through drilling hole or a blind hole. The support elements 12 are arranged at an inner surface 14 of the ring-shaped element 11. A radius can thereby be provided as a transition between the respective support element 12 and the inner surface 14. The respective support elements 12 have a front surface at an end 15, which is located away from the inner surface 14.

FIG. 1 further shows a cylindrical outer surface 20 with a predetermined surface quality. The cylindrical outer surface 20 is configured to keep a distance from an outer conductor, which is not shown in FIG. 1.

Figure 2:
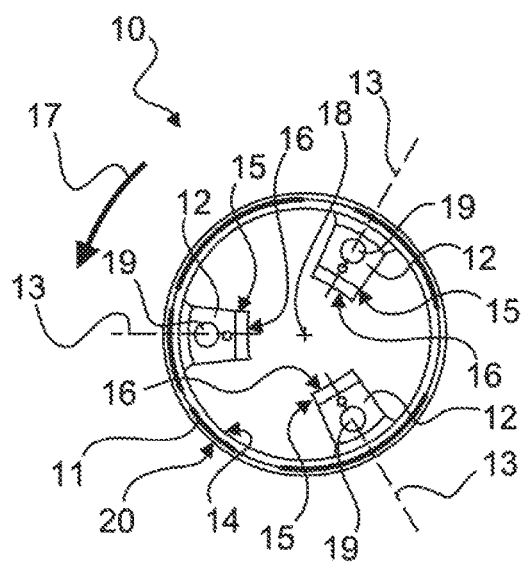
FIG. 2 shows a view from top of a spacer according to an embodiment of the invention.

As shown in FIG. 2, the front surfaces 16 at the end 15, which are located away from the inner surface 14, have a curved shape. Thus, on each of the three support elements 12 a respective curved front surface 16 is provided at the end 15, which is located away from the inner surface 14 of the ring-shaped element 11.

Figure 2A:
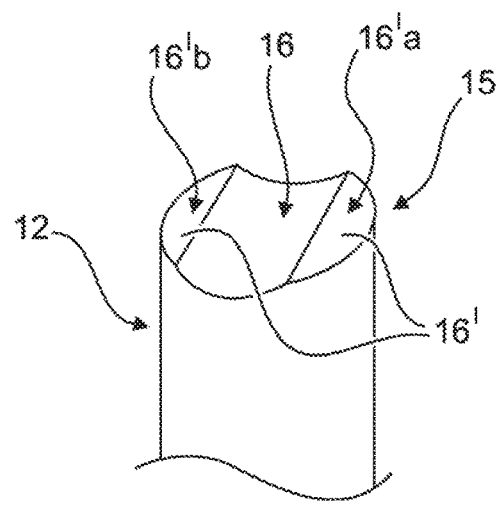
FIG. 2A shows an end of a support element with a partially plane and a partially curved front surface according to an embodiment of the invention.

FIG. 2A shows an example of a support element 12, that has an end 15, which is located away from the inner surface 14, but is not shown in FIG. 2A. The end 15, which is located away from the inner surface 14, comprises a plane front surface 16' in addition to the curved surface 16, whereby the plane front surface 16' is preferably formed from two plane sections 16'a. 16'b. Hence, the respective end 15 of the support elements 12, which is located away from the inner surface 14, have a curved section, in particular the curved surface 16, and moreover, also two plane sections 16'a, 16'b, in particular the plane front surface 16'. In other words, the ends 15 of the support elements 12 are partially curved and partially plane. Thus, wear of the ends of the support elements can be reduced, or rather avoided. As further shown in FIG. 2A, the plane sections 16'a, 16'b of the front surface 16' are offset in a curvature direction of the curved front surface 16 and arranged in a plane.

In the view from top of the spacer 10 the FIG. 2 shows, that the support elements 12 are arranged in regular intervals along a peripheral direction 17 of the ring-shaped element 11. It can particularly be provided, that the support elements 12 have a respective constant distance between one another along the peripheral direction 17. The respective angle between the radially direction 13 of the respective support elements 12 preferably measures 120°. The ring-shaped element 11 of the spacer 10 further comprises a centre point, which is located on a rotation axis 18 of the ring-shaped element 11.

Figure 3:
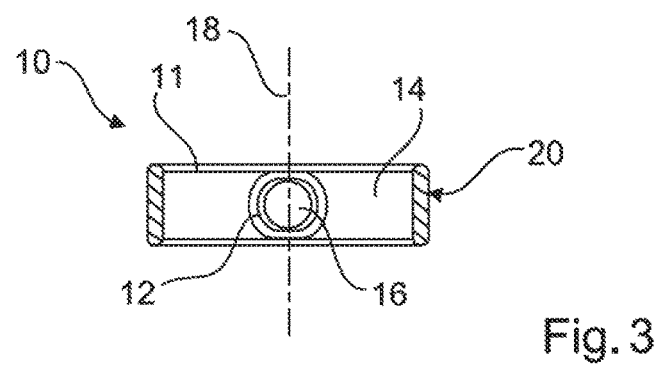
FIG. 3 shows a sectional view of a spacer according to an embodiment of the invention.

FIG. 3 shows a sectional view of the spacer 10, especially through the ring-shaped element 11. It is shown, that the ring-shaped element 11 has a chamfer on its edges, in particular at the edges bounding the inner surface 14. It is further shown, that the support element 12 can have an oval shape or rather an outline shape that deviates from being a circle, in an outline of the inner surface 14. The front surface 16 is shown in a view from top in FIG. 3. Furthermore, the rotation axis 18 of the ring-shaped element 11 or rather the spacer 10 is shown. The rotation axis 18 passes through the centre point of the ring-shaped element 11.

Figure 4:
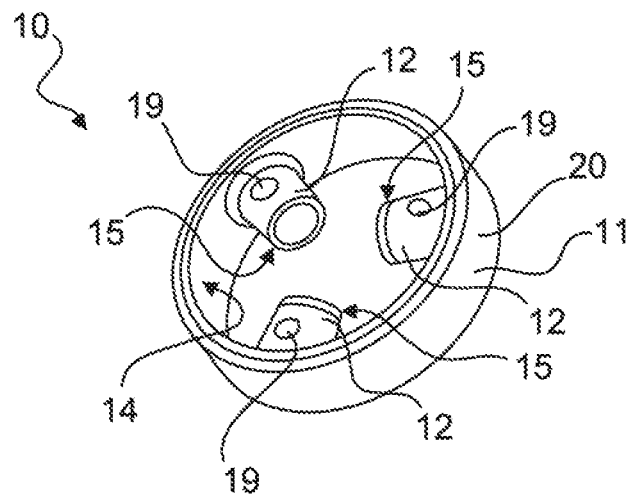
FIG. 4 shows a perspective view of a spacer according to a further embodiment of the invention.

FIG. 4 shows another example of the spacer 10, which comprises a ring-shaped element 11 as well as three support elements 12. One drilling hole 19 each is provided in the support elements 12, whereby the drilling holes 19 can be a through drilling hole or a blind hole. The outer surface 20 of the ring-shaped element 11 is also designed, to keep a distance from the outer conductor, which is not shown in FIG. 4. The spacer 10 in this type of embodiment is provided with curved front surfaces at an end 15, which is located away from the inner surface 14, of the support element 12.

Figure 5:
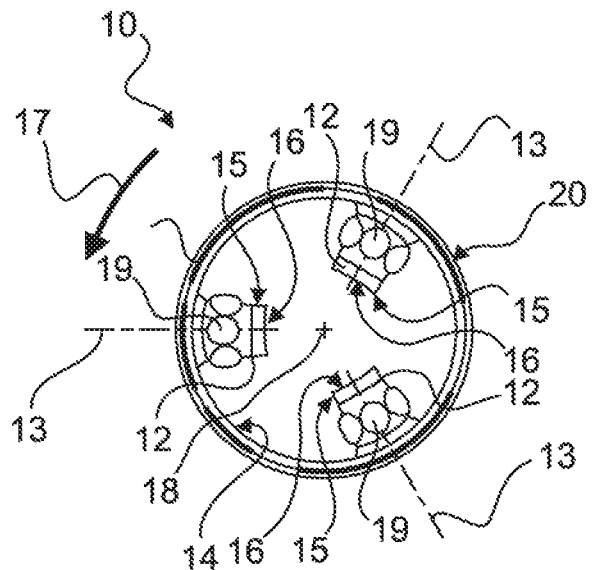
FIG. 5 shows a view from top of a spacer according to a further embodiment of the invention.

Those curved front surfaces 16 are shown in the view from top of the spacer 10 in FIG. 5. In this type of embodiment the support elements 12 are arranged in regular intervals, but preferably in equal intervals, to one another. The angle between the radially direction 13 of the respective support elements 12 measures 120° for example. The radially directions 13 of the respective support elements 12 pass through the centre point of the ring-shaped element 11, which is located on the rotation axis 18 of the ring-shaped elements 11 or rather the spacer 10.

Figure 6:
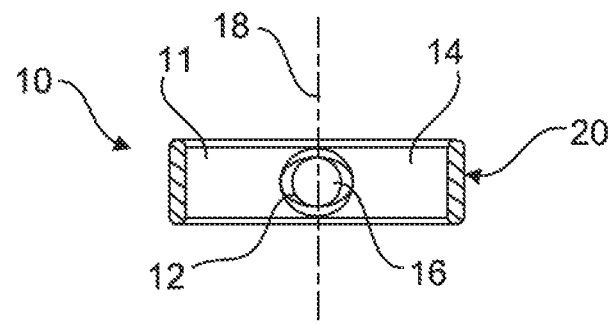
FIG. 6 shows a sectional view of a spacer according to a further embodiment of the invention.

FIG. 6 shows the spacer 10, whereby a sectional view of the ring-shaped element 11 is displayed. It is shown, that the support element 12 has a base area in the area of the inner surface 14 of the ring-shaped element 11, which deviates from being a circle or rather being oval. It is also possible, that the ring-shaped element 11 has chamfers on its edges, especially in the area of the inner surface 14.

The embodiment shown in the FIGS. 4 to 6 comprises round support elements 12. Furthermore, material reinforcements are intended in the area of the inclined drilling holes 19 of the support elements 12. The material reinforcement may, for example, have the form of an added sphere.

Figure 7:
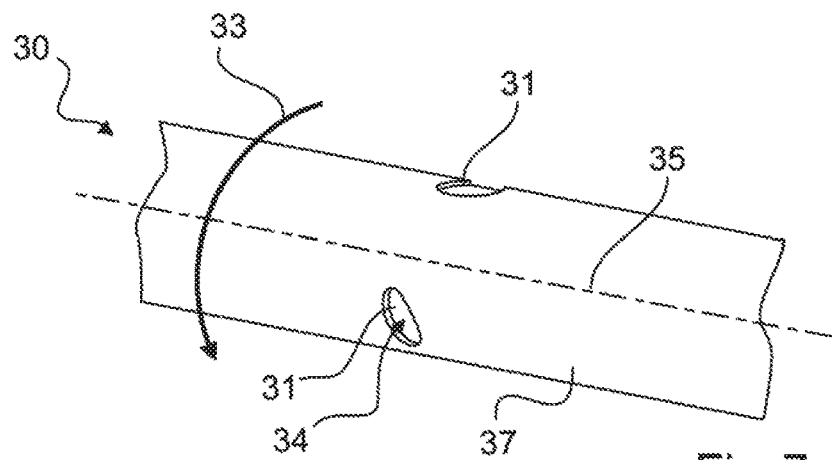
FIG. 7 shows a perspective view of a bar-shaped inner conductor according to an embodiment of the invention.

FIG. 7 shows a bar-shaped inner conductor 30 with openings 31, which are provided in a surface 37 of the bar-shaped inner conductor 30. The openings 31 are arranged at the surface 37 of the bar-shaped inner conductor 30 in a row along a peripheral direction 33 of the bar-shaped inner conductor 30. At least three openings 31 can thereby be provided on the surface 37 of the bar-shaped inner conductor 30. The openings 31 are blind holes, whereby a base area 34 of the respective openings 31 has a curved shape. In particular, the base area of the openings 31 has a single curved shape, whereby the base area is curved with respect to a rotation axis, which runs parallel and preferably with a distance from a rotation axis 35 of the bar-shaped inner conductor 30. In other words, the curved base area 34 comprises a radius, of which centre point is not located on the rotation axis 35 of the bar-shaped inner conductor 30.

Figure 8:
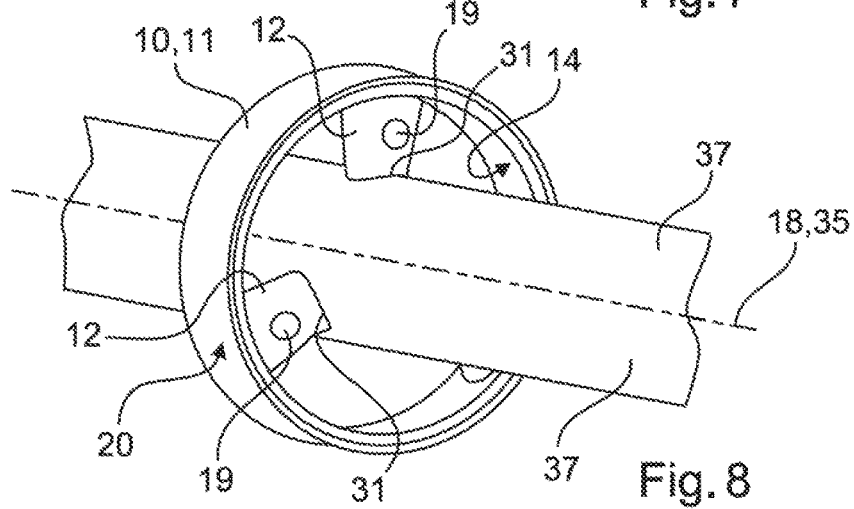
FIG. 8 shows a perspective view of a bar-shaped inner conductor and of a spacer engaging with the bar-shaped inner conductor according to an embodiment of the invention.

FIG. 8 shows a bar-shaped inner conductor 30 und a spacer 10, which engages with the bar-shaped inner conductor 30. The spacer 10 has a ring-shaped element 11 with an inner surface 14. The support elements 12 point out of the inner surface 14 in a radial direction of the ring-shaped element 11. The radially direction means, that the support elements 12 point out of the inner surface 14 towards a centre point of the ring-shaped element 11. With respect to the example shown in FIG. 8, the radially direction thus passes through the rotation axis 18 of the ring-shaped element 11 as well as through the rotation axis 35 of the bar-shaped inner conductor 30.

The support elements 12 intrude into the openings 31, which are provided in the surface 37 of the bar-shaped inner conductor 30. Thereby, the curved front surfaces 16 which are hidden in FIG. 8, are recessed into the bar-shaped inner conductor 30 and rest on the also hidden base area 34 of the bar-shaped inner conductor 30, which is also not shown in FIG. 8.

Drilling holes 19 are also shown, which pass through the respective support elements 12 of the spacer 10.

Figure 9:
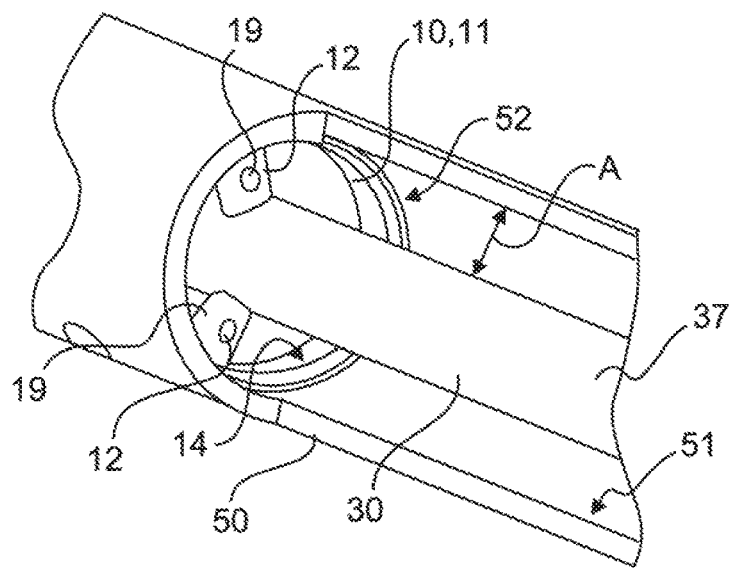
FIG. 9 shows a sectional view of an outer conductor and a perspective view of a bar-shaped inner conductor and of a spacer engaging with the bar-shaped inner conductor according to an embodiment of the invention.

FIG. 9 shows an outer conductor 50 in cut-away view and also the bar-shaped inner conductor 30 the spacer 10 engages with. Thus, FIG. 9 corresponds with FIG. 8, whereby FIG. 9 shows the outer conductor 50 of the coaxially measuring probe in addition. The spacer 10 is configured to keep a constant distance A or rather adjust a distance between the bar-shaped inner conductor 30 and the outer conductor 50. Due to the spacer 10, which engages with the bar-shaped inner conductor 30 by its support elements 12, acting forces can thus be transmitted between the bar-shaped inner conductor 30 and the tubular outer conductor 50. A gap can be provided between the outer surface 20 of the spacer 10 and the outer conductor 50, so that almost no clearance between the spacer 10 and the outer conductor 50 occurs. Thus, acting forces can be effectively transmitted between the bar-shaped inner conductor 30 and the outer conductor 50 via the spacer 10. In other words, the distance A between the outer conductor 50 and the bar-shaped inner conductor 30 can essentially be kept constant, even when lateral forces, for example vibration loads, act upon the bar-shaped inner conductor 30 or the outer conductor 50.

Figure 10:
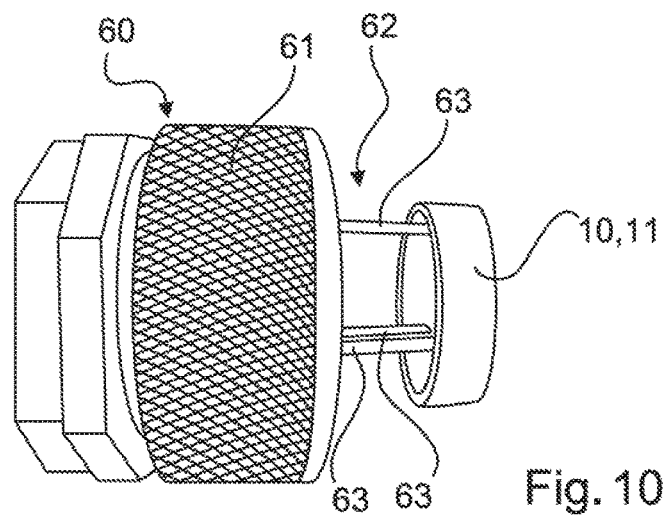
FIG. 10 shows an assembly tool for assembling a spacer according to an embodiment of the invention.

FIG. 10 shows a tool 60 for assembling the spacer 10 on the bar-shaped inner conductor 30. The bar-shaped inner conductor 30 is not displayed in FIG. 10. The tool 60 comprises a ring-shaped clamping device 62 with at least three pin-shaped elements 63. The tool 60 further comprises a coarse surface 61 for operating the tool.

Figure 11:
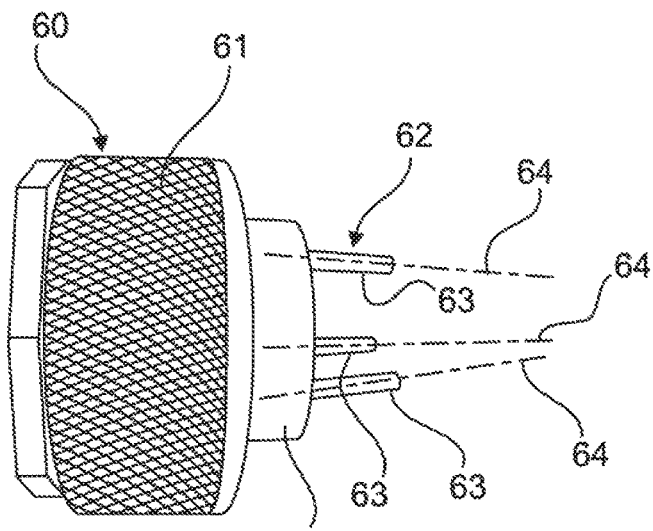
FIG. 11 shows a tool for assembling a spacer according to a further embodiment of the invention.

As shown in FIG. 11, the pin-shaped elements 63 have a respective longitudinal axis 64, whereby the longitudinal axis 64 of the respective pin-shaped elements 63 is inclined to each other. The pin-shaped elements 63 are movably mounted in the ring-shaped clamping device 62, so that the longitudinal axes 64 of the pin-shaped elements 63 always meet at a common point. But it is also possible, that the longitudinal axes 64 of each pin-shaped elements 63 do not meet at a common point. Furthermore, the spacer 10 is provided on the tool 60. In particular, the spacer 10 is plugged or rather pushed onto the tool 60 to assembly the spacer 10 at the bar-shaped inner conductor 30.

Figure 12:
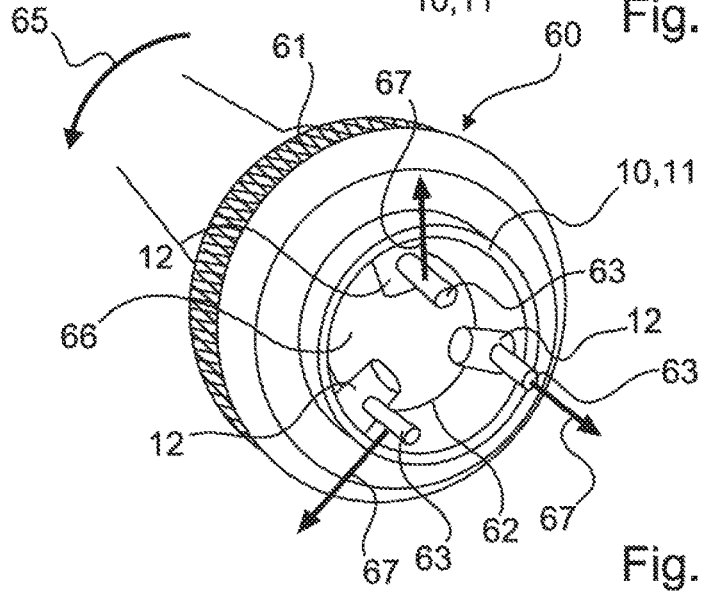
FIG. 12 shows the pre-tensioning of the spacer by a tool according to an embodiment of the invention.

It is shown in FIG. 12, that the pin-shaped elements 63 of the tool 60 are pushed through the drilling holes 19 of the respective support element 12. FIG. 12 further shows, that the pin-shaped elements 63 are arranged in regular intervals at a front surface 66 of the ring-shaped along a peripheral direction 65 of the tool 60. For example, the pin-shaped elements 63 are also arranged in respective equal intervals to each other along the peripheral direction 65 of the ring-shaped clamping device 62. By pushing the pin-shaped elements 63 of the tool 60 through the drilling holes 19 of the respective support element 12, the pre-tensioning of the spacer 10 takes place. In the process the tool 60 is moved along the rotation axis 18 of the ring-shaped element 11.

However, the spacer 10 is plugged onto the tool 60. It is possible, that the tool 60 pretensions the spacer 10 by moving the pin-shaped elements 63 in the directions marked by arrows 67. In other words, the pin-shaped elements 63 can be configured to pretension the spacer 10 for the assembly on the bar-shaped inner conductor 30, which is not shown in FIG. 12, by reducing an angle between the longitudinal axes 64 of at least two pin-shaped elements 63, but preferably of three pin-shaped elements 63. The pre-tensioning of the spacer 10 preferably happens by merely pushing the pin-shaped elements 63 through the drilling holes 19 of the support elements 12. The deformation of the ring-shaped element 11 of the spacer 10 is clearly shown in FIG. 12. Thus, the spacer 10 or rather the ring-shaped element 11 is widened at the places, where the pin-shaped elements 63 are located.

Figure 13:
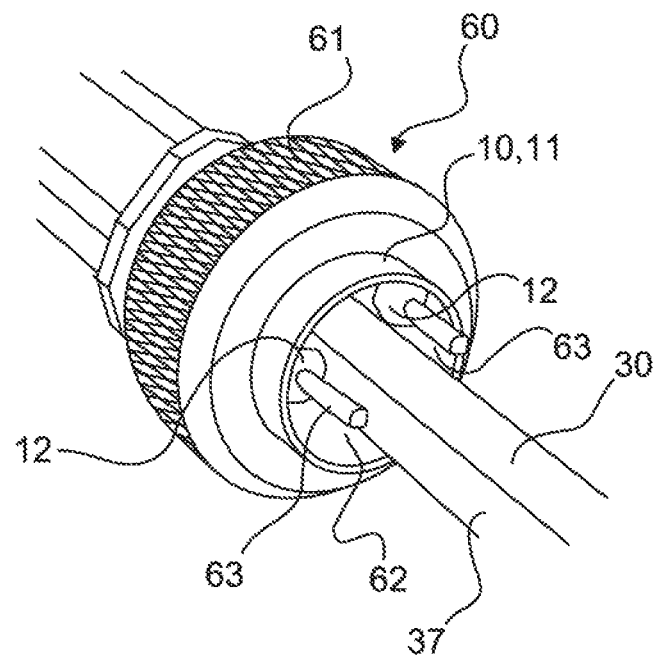
FIG. 13 shows a positioning of a spacer over a bar-shaped inner conductor with a tool according to an embodiment of the invention.

FIG. 13 shows the positioning of the spacer 10 on the bar-shaped inner conductor 30, whereby the spacer 10 is pre-tensioned by means of the pin-shaped elements 63 of the tool 60. The spacer 10 can be pre-tensioned by the pin-shaped elements 63 in such a way, that the curved front surfaces 16 of the support elements 12 are movable along or on the surface 37 of the bar-shaped inner conductor 30. In other words, the spacer 10 is pushed over the surface 37 of the bar-shaped inner conductor 30 to the desired position on the bar-shaped inner conductor 30.

Figure 14:
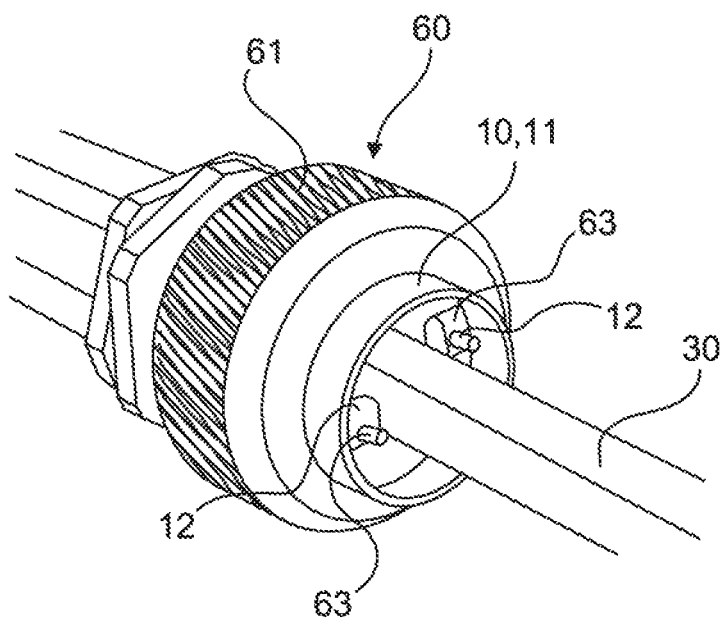
FIG. 14 shows a positioning of a spacer on a bar-shaped inner conductor with a tool according to a further embodiment of the invention.

As shown in FIG. 14, the spacer 10 is relaxed after the positioning of the spacer 10 on the bar-shaped inner conductor 30 by pulling the pin-shaped elements 63 out of the drilling holes 19 of the support elements 12, so that the support elements 12 of the spacer 10 engage with the openings 31 of the bar-shaped inner conductor 30. The curved front surfaces 16 of the support elements 12 thereby rest on the curved base areas 34 of the bar-shaped inner conductor 30. It should further be noted, that while pushing the spacer 10 onto the bar-shaped inner conductor 30 as shown in FIG. 13, the deformation of the spacer 10 occurs in such a way, that the curved front surfaces 16 of the support elements 12 have the same radius as the surface 37 of the bar-shaped inner conductor 30.

FIG. 15 shows a side view of a bar-shaped inner conductor 30. The bar-shaped inner conductor 30 comprises a fixing unit 80, for example a screw connection, at a first end of the bar-shaped inner conductor 30, over which the bar-shaped inner conductor 30 is mounted at the measuring device. The outer conductor 50 can be fixed onto this measuring device, so that the bar-shaped inner conductor 30 is merely connected to the outer conductor 50 through the measuring device, because a small gap can be provided between the spacer 10 and the outer conductor 50. The bar-shaped inner conductor 30 further comprises a first row 32 with at least three openings 31 along a peripheral direction 33 of the bar-shaped inner conductor 30 in order to receive a support element 12 of a spacer 10. The spacer 10 is not shown in FIG. 15. Only one opening 31 of the first row 32 is shown entirely. The bar-shaped inner conductor 30 further comprises a second row 36 with at least three openings 31 along a peripheral direction 33 of the bar-shaped inner conductor 30 in order to receive a respective support element of a further spacer 10, which is not shown in FIG. 15. Furthermore, only one opening 31 of the second row 36 of openings 31 is shown entirely. The second row 36 with at least three openings 31 is arranged in the area of a second end of the bar-shaped inner conductor 30. The first row 32 with the at least three openings 31 is arranged nearly concentric between the fixing unit 80 and the second row 36 with at least three openings 31 on the bar-shaped inner conductor 30.

FIG. 16 shows the bar-shaped inner conductor 30 as well as the outer conductor 50, whereby the outer conductor 50 being kept at a distance A between the two spacers 10 and the bar-shaped inner conductor 30. In particular, the spacers 10 are configured to hold or rather to distance the bar-shaped inner conductor 30 with respect to the outer conductor 50 in an essentially coaxial way. It is also shown in FIG. 16, that the rotation axis 18 of the spacer 10 is located on the rotation axis 35 of the bar-shaped inner conductor 30, when the filling level measuring probe is in a assembled state and the bar-shaped inner conductor 30 and the outer conductor 50 are arranged coaxially to one another.

FIG. 17 shows a side view of the filling level measuring probe 70 with an outer conductor 50. A number of drilling holes can be provided in the outer conductor 50, which are arranged offset to one another. In FIG. 17 the bar-shaped inner conductor 30 as well as the outer conductor 10 are hidden by the outer conductor 50.

Figure 18:
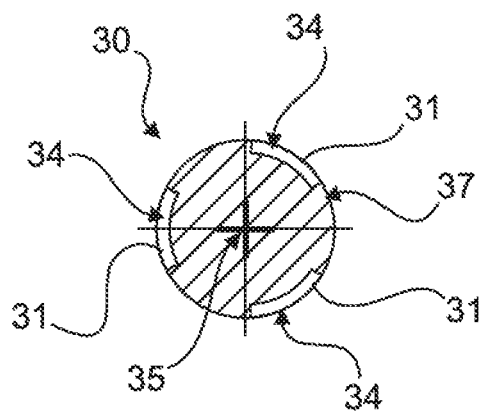
FIG. 18 shows a sectional view of a bar-shaped inner conductor according to an embodiment of the invention.

FIG. 18 shows a side view of a bar-shaped inner conductor 30, whereby the bar-shaped inner conductor 30 comprises openings 31, especially recesses, in the surface 37 of the bar-shaped inner conductor 30. The openings 31 have a base area 34, whereby each base area 34 comprises a radius, of which centre point is not located on the rotation axis 35 of the bar-shaped inner conductor 30. The base areas 34 of the openings 31 are configured to engage with the curved front surfaces 16 of the support elements 12 of the spacer 10. The spacer 10 is not shown in FIG. 18.

Figure 19:
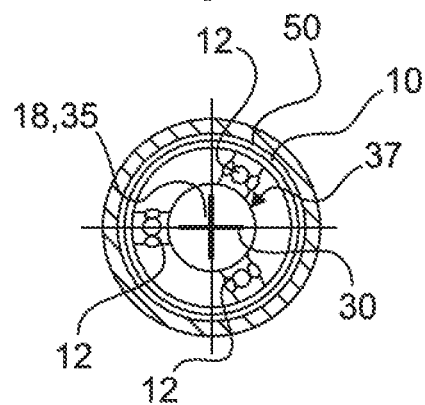
FIG. 19 shows a sectional view of a coaxial measuring probe according to an embodiment of the invention.

FIG. 19 shows a sectional view through an outer conductor 50 and a bar-shaped inner conductor 30 of a coaxially filling level measuring probe 70 as well as a view from top of a spacer 10. The support elements 12 of the spacer 10 engage with the openings 31, which are not shown in FIG. 19, located at the surface 37 of the bar-shaped inner conductor 30 in order to coaxially align the outer conductor 50 with the bar-shaped inner conductor 30 or rather to keep a distance between the outer conductor 50 and the bar-shaped inner conductor 30. Thus, the rotation axis 18 of the spacer 10 is located on the rotation axis 35 of the bar-shaped inner conductor 30.

Figure 20:
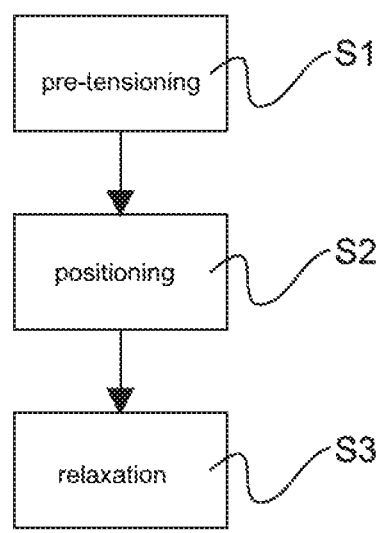
FIG. 20 shows a flow diagram for an assembly method for assembling a spacer on a bar-shaped inner conductor according to an embodiment of the invention.

FIG. 20 shows a flow diagram for an assembly method for assembling a spacer 10 on a bar shaped inner conductor 30. In a first step S1 of the method a pre-tensioning of the spacer 10 takes place, so that the support elements 12 of the ring-shaped element 11 are movable over a surface 37 of the bar-shaped inner conductor 30 along a rotation axis 35 of the bar-shaped inner conductor 30. In a further step S2 of the method a positioning of the spacer 10 with respect to the bar-shaped inner conductor 30 takes place. The spacer 10 is thereby moved over the bar-shaped inner conductor 30 or rather pushed onto the bar-shaped inner conductor 30 and also positioned over the openings 31 of the bar-shaped inner conductor 30. In a further step S3 of the method a relaxation of the spacer 10 takes place, so that the support elements 12 of the ring-shaped element 11 engage with the corresponding openings 31 of the bar-shaped inner conductor 30.

It should be added, that "comprising" does not exclude other elements or steps and "one" does not exclude a plurality. Furthermore it should be noted, that characteristics or steps, that were described with reference to one of the execution examples above, can also be used in combination with other characteristics or steps of other execution examples described above. Reference signs in the claims shall not be considered as restrictions.

The invention claimed is:

1. A spacer for keeping a distance between a bar-shaped inner conductor and an outer conductor of a filling level measuring probe, comprising:
   a ring; and
   at least three supports, each of which extends out of an inner surface of the ring in a corresponding radial direction,
   wherein each of the three supports has a distal end which has a curved front surface facing away from the inner surface,
   wherein the end facing away from the inner surface is engageable with an opening of the bar-shaped inner conductor, and
   wherein each of the at least three support elements has a drilling hole.

2. The spacer according to claim 1,
   wherein the at least three supports are reduced in a radial direction.

3. The spacer according to claim 1,
   wherein the at least three supports are arranged at regular intervals along a peripheral direction of the ring.

4. The spacer according to claim 1,
   wherein the curved front surface of at least one of the at least three supports has a radius with a centre point that is not located on a rotational symmetry axis of the ring.

5. The spacer according to claim 1,
   wherein drilling axes of the drilling holes extending through the supports are arranged to be inclined to a rotation axis of the ring.

6. The spacer according to claim 1,
   wherein the respective drilling axes of the drilling holes extending through the supports meet at a common point, which is located on the rotation axis of the ring.

7. The spacer according to claim 1,
   wherein the spacer is made of a synthetic material.

8. A measuring probe configured to determine a filling level of a medium in a container, the measuring probe comprising:
   at least one spacer according to claim 1, and
   a bar-shaped inner conductor, including:
      a first row with at least three openings along a peripheral direction of the bar-shaped inner conductor, the first row retaining a respective support of a spacer,
   wherein the at least three openings each has a curved base area with a radius, each curved base area having a centre point that is not located on a rotation axis of the bar-shaped inner conductor.

9. The measuring probe according to claim 8,
   wherein each curved base area of the at least three openings is singly curved, and
   wherein for each singly curved base area a respective rotation axis and the rotation axis of the bar-shaped inner conductor are arranged at a distance from one another.

10. The measuring probe according to claim 8, further comprising:
    a second row with at least three openings along the peripheral direction of the bar-shaped inner conductor, the second row retaining a respective support of a spacer;
    wherein the second row with the at least three openings and the first row with the at least three openings are arranged at a distance from one another along a rotation axis of the bar-shaped inner conductor.

11. A measuring probe for determining a filling level of a medium in a container, comprising:
    at least one spacer according to claim 1;
    the bar-shaped inner conductor with at least three openings along a peripheral direction of the bar-shaped inner conductor; and
    the outer conductor,
    wherein the spacer holds together the bar-shaped inner conductor and the outer conductor in a substantially coaxial way by engaging the supports with the at three openings of the bar-shaped inner conductor.

12. The measuring probe according to claim 11,
    wherein the bar-shaped inner conductor and the outer conductor are aligned in a substantially coaxial way by two spacers arranged at a distance from one another along a rotation axis of the bar-shaped inner conductor.

13. The measuring probe according to claim 11,
    wherein the ring of the at least one spacer having a cylindrical outer surface, and
    wherein a gap is provided between the cylindrical outer surface of the ring and an inner surface of the outer conductor.

14. A tool configured to assemble the at least one spacer on the bar-shaped inner conductor of the measuring probe according to claim 11,
    wherein the tool includes a plurality of pin-shaped elements configured to engage with the drilling holes of the at least three support elements for mounting the spacer on the bar-shaped inner conductor.

15. An assembly method for assembling a spacer for keeping a distance between a bar-shaped inner conductor and an outer conductor of a filling level measuring probe having a ring and at least three supports, each of which extends out of an inner surface of the ring in a corresponding radial direction, wherein each of the three supports has a distal end which has a curved front surface facing away from the inner surface, and wherein the end facing away from the inner surface is engageable with an opening of the bar-shaped inner conductor on the bar-shaped inner conductor, comprising:
    pre-tensioning the spacer to guide the supports of the ring over a surface of the bar-shaped inner conductor along a rotation axis of the bar-shaped inner conductor;
    positioning the spacer with respect to the bar-shaped inner conductor;
    relaxing the spacer to permit insertion of the supports of the ring into corresponding openings of the bar-shaped inner conductor.

* * * * *